(12) United States Patent
Binek et al.

(10) Patent No.: US 10,888,886 B2
(45) Date of Patent: Jan. 12, 2021

(54) MODULAR COLD-SPRAY RECEIVER

(71) Applicant: UNITED TECHNOLOGIES CORPORATION, Farmington, CT (US)

(72) Inventors: Lawrence Binek, Glastonbury, CT (US); Aaron T. Nardi, East Granby, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 433 days.

(21) Appl. No.: 15/846,491

(22) Filed: Dec. 19, 2017

(65) Prior Publication Data

US 2019/0184417 A1 Jun. 20, 2019

(51) Int. Cl.
| | |
|---|---|
| *B05B 7/16* | (2006.01) |
| *B05B 15/18* | (2018.01) |
| *C23C 24/04* | (2006.01) |
| *B05B 7/14* | (2006.01) |
| *F16L 19/02* | (2006.01) |
| *B05B 15/65* | (2018.01) |

(52) U.S. Cl.
CPC .............. *B05B 7/16* (2013.01); *B05B 7/1486* (2013.01); *B05B 15/18* (2018.02); *C23C 24/04* (2013.01); *F16L 19/0237* (2013.01); *B05B 15/65* (2018.02)

(58) Field of Classification Search
CPC ......... B05B 7/16; B05B 7/1486; B05B 15/18; B05B 15/65; C23C 24/04; F16L 39/005; F16L 19/0237; F16L 19/025; F16L 19/048
USPC ........................ 285/122.1, 148.1, 272.1, 354
See application file for complete search history.

(56) References Cited

U.S. PATENT DOCUMENTS

| | | | | |
|---|---|---|---|---|
| 1,082,993 | A * | 12/1913 | Beattie | |
| 3,301,051 | A * | 1/1967 | Smith | F16L 19/0237 |
| 5,178,188 | A * | 1/1993 | Russell | F16L 19/0237 |
| 6,722,584 | B2 | 4/2004 | Kay et al. | |
| 2011/0293919 | A1* | 12/2011 | Ajdelsztajn | C23C 24/04 |
| 2013/0285373 | A1* | 10/2013 | Bayer | F16L 19/025 |
| 2015/0059862 | A1* | 3/2015 | Spears, II | F16L 39/005 |
| 2016/0168721 | A1 | 6/2016 | Nardi et al. | |

\* cited by examiner

*Primary Examiner* — Zachary T Dragicevich
(74) *Attorney, Agent, or Firm* — Bachman and LaPointe PC; George Coury

(57) ABSTRACT

An adapter for connecting a cold-spray nozzle to a cold-spray machine includes a receiver having a first end and a second end and defining an internal space for receiving the cold-spray nozzle; an end cap engageable with the first end of the receiver for securing the cold-spray nozzle in the receiver and having an opening aligned with an outlet of the cold-spray nozzle; and a threaded connection at the second end of the receiver, the threaded connection being configured for connection to the cold-spray machine.

24 Claims, 8 Drawing Sheets

MODULAR COLD-SPRAY RECEIVER

BACKGROUND OF THE DISCLOSURE

The disclosure relates to cold-spray systems and, more particularly, to a cold-spray nozzle mounting assembly.

The cold-spray process relies on accelerating heated metal powder to supersonic velocities to build an additive deposition. The heated metal powder is applied through a spray nozzle, and clogging or other types of fouling of the nozzle is an issue to be addressed. Some nozzles are found to be better at avoiding these issues, and/or may have other properties that are desirable. However, not all nozzles are compatible with all cold-spray machines, therefore potentially limiting the choices available to an operator of a machine to only compatible nozzles. The present disclosure addresses this issue.

SUMMARY OF THE DISCLOSURE

According to the disclosure, an adapter for connecting a cold-spray nozzle to a cold-spray machine is provided, and comprises a receiver having a first end and a second end and defining an internal space for receiving the cold-spray nozzle; an end cap engageable with the first end of the receiver for securing the cold-spray nozzle in the receiver and having an opening aligned with an outlet of the cold-spray nozzle; and a threaded connection at the second end of the receiver, the threaded connection being configured for connection to the cold-spray machine.

In accordance with a non-limiting configuration, the adapter further comprises a nut structure attached to the second end of the receiver and defining the threaded connection.

In a further non-limiting configuration, the second end of the receiver has a radially outwardly extending flange, and the nut structure has a radially inwardly extending wall configured to engage against the flange of the receiver.

In a further non-limiting configuration, the nut structure is a split nut assembly.

In a further non-limiting configuration, the split nut assembly comprises two nut portions configured to be assembled around the flange of the receiver, and at least one fastener to hold the two nut portions together in an assembled position.

In a further non-limiting configuration, the adapter further comprises a retaining member to capture the flange of the receiver in the nut structure.

In a further non-limiting configuration, the inwardly retaining wall is a tapered wall, and the retaining member comprises a split wedge ring configured to slide along the tapered wall.

In a further non-limiting configuration, the adapter further comprises a nozzle inlet section in the internal space and positioned to align with the cold-spray nozzle.

In a further non-limiting configuration, the nozzle inlet section defines a converging flow area leading to the cold-spray nozzle.

In a further non-limiting configuration, an outlet end of the converging flow area terminates in a diameter which is smaller than an inlet to the cold-spray nozzle.

In a further non-limiting configuration, the nozzle inlet section further comprises an outwardly facing groove, and further comprises a seal positioned in the groove to seal against an inner wall of the receiver.

In a further non-limiting configuration, a cooling space is defined between an inner wall of the receiver and an outer wall of the cold-spray nozzle, and the adapter further comprises a cooling inlet and a cooling outlet on the receiver for flow of coolant through the cooling space.

In a further non-limiting configuration, the end cap has a first inner diameter section configured to match an outside diameter of the cold-spray nozzle, and a second inner diameter section configured to match an outside diameter of the receiver.

In a further non-limiting configuration, the adapter further comprises a first inwardly facing groove in the first inner diameter section, a first seal positioned in the first inwardly facing groove to seal against the cold-spray nozzle, a second inwardly facing groove in the second inner diameter section, and a second seal in the second inwardly facing groove to seal against the receiver.

In a still further non-limiting configuration, the adapter is combined with a cold-spray system configured to generate a flow of cold-spray materials and having a threaded connection for a cold-spray nozzle.

In a further non-limiting configuration, a method is provided for connecting a non-threaded cold-spray nozzle to a cold-spray machine having a threaded connection, the method comprising the steps of: positioning a cold-spray nozzle in a receiver having a first end and a second end and defining an internal space for receiving the cold-spray nozzle; engaging an end cap with the first end of the receiver to secure the cold-spray nozzle in the receiver, the end cap having an opening aligned with an outlet of the cold-spray nozzle; and connecting a threaded connection at the second end of the receiver with the threaded connection of the cold-spray machine.

BRIEF DESCRIPTION OF THE DRAWINGS

A detailed description of non-limiting embodiments follows, with reference to the attached drawings, wherein.

DETAILED DESCRIPTION

The disclosure relates to cold-spray systems and, more particularly, to a cold-spray nozzle mounting assembly.

Specifically, the disclosure relates to an adapter for connecting a cold-spray nozzle to a cold-spray machine with which the nozzle would not normally be compatible.

Figure 1:
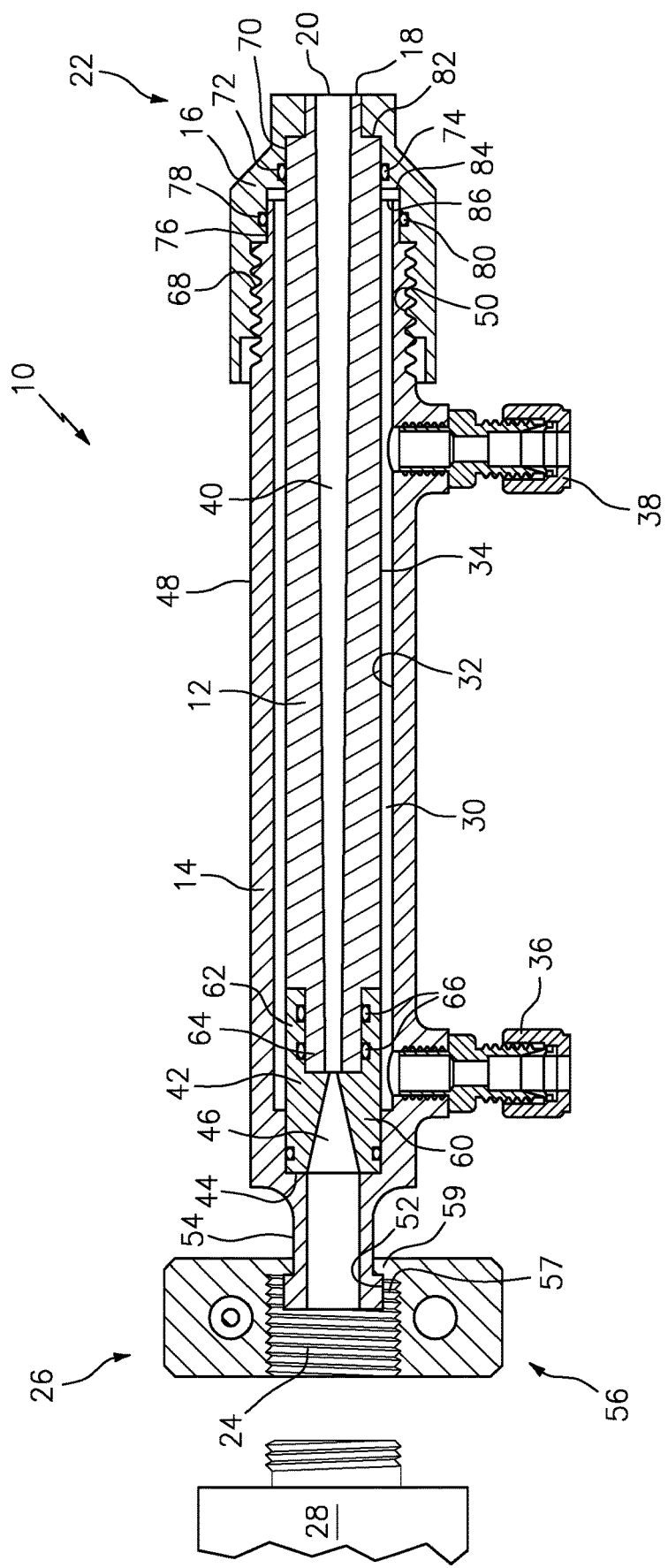
FIG. 1 is a cross section through an adapter and cold-spray nozzle according to the disclosure.

FIG. 1 illustrates a cold-spray nozzle assembly 10 including a cold-spray nozzle 12, a receiver 14 for receiving cold-spray nozzle 12 and an end cap 16 threadedly engaged with receiver 14 to secure cold-spray nozzle 12 within receiver 14.

End cap 16 has an opening 18 which is aligned with an opening 20 of cold-spray nozzle 12, and which defines an outlet end 22 of the cold-spray nozzle assembly 10. Receiver 14 also has a threaded connection 24 at an inlet end 26 of cold-spray nozzle assembly 10, and threaded connection 24 is configured to mount to a threaded mounting structure on a cold-spray machine 28 which is schematically illustrated in FIG. 1. Cold-spray machines themselves are well-known to those of ordinary skill in the art, and are not further described herein.

Still referring to FIG. 1, a cooling space 30 is defined between an inner wall 32 of receiver 14 and an outer wall 34 of cold-spray nozzle 12. Further, cooling inlet and outlet structures 36, 38 are provided in receiver 14 to allow a cooling fluid to be passed through cooling space 30.

Cold-spray nozzle 12 as illustrated in FIG. 1 has an inner diverging flow passage 40 terminating in opening 20. In cold-spray processes, cold-spray nozzle 12 must also have a converging section, which in some cases will be an integral portion of the cold-spray nozzle 12. In the configuration of FIG. 1, however, a nozzle inlet section 42 is provided. In this case, nozzle inlet section 42 is held in receiver 14 between an inlet end shoulder 44 of receiver 14 and cold-spray nozzle 12 and nozzle inlet section 42 defines an inner converging flow passage 46 which is aligned with the diverging flow passage 40 of cold-spray nozzle 12.

Figure 2:
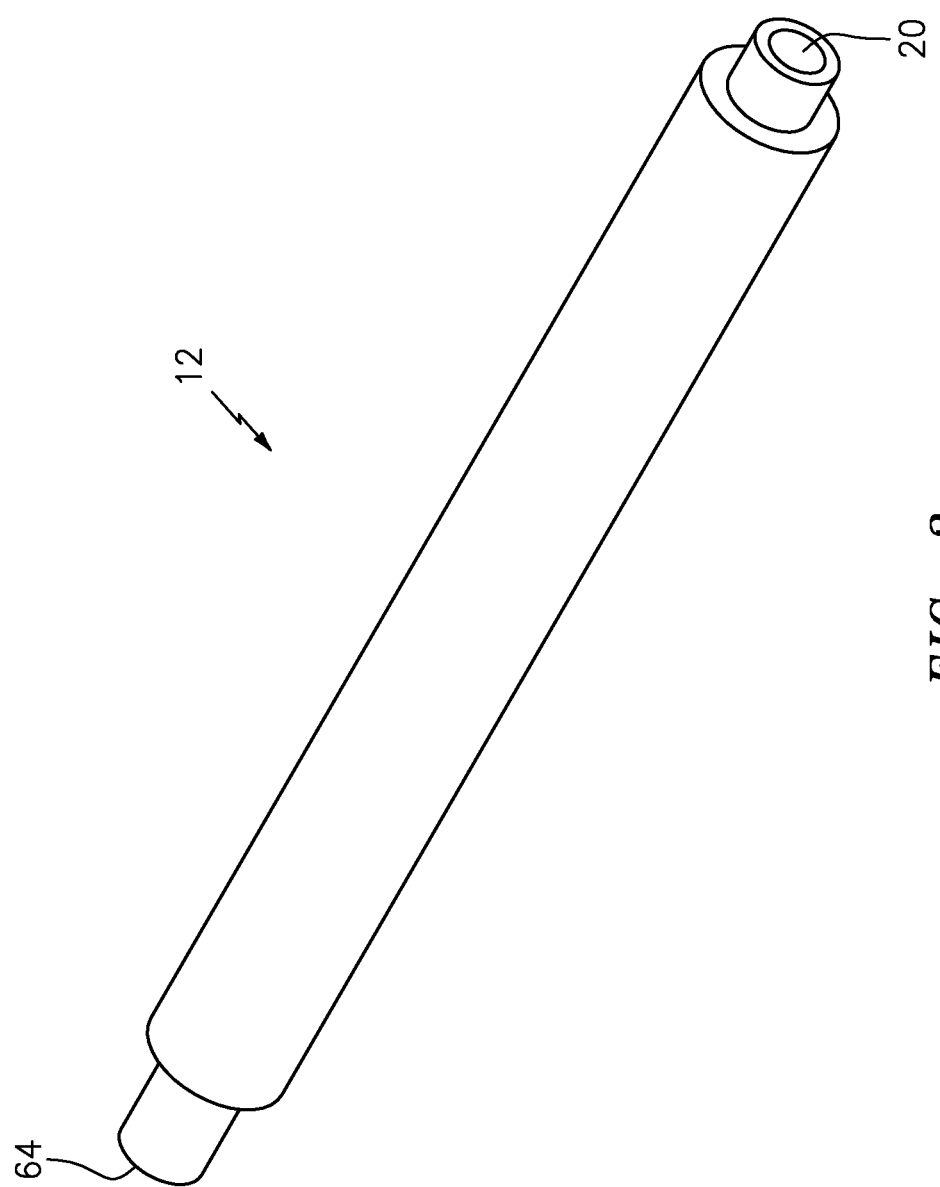
FIG. 2 is a perspective view of a typical cold-spray nozzle for which the adapter of FIG. 1 is configured.

Referring also to FIG. 2, a perspective view is provided of a typical cold-spray nozzle 12 for use with the disclosed configuration. Cold-spray nozzle 12 in this configuration has smooth cylindrical sections at the inlet and outlet ends which would not normally be compatible with a cold-spray machine 28 such as is schematically illustrated in FIG. 1. Thus, and referring also to FIG. 1, assembly 10 according to the present disclosure adapts a cold-spray nozzle 12 such as is shown in FIG. 2 to a cold-spray machine with which it would not normally be compatible. In other words, cold-spray nozzle 12 having a smooth cylindrical inlet end is configured for connection to a machine which is compatible with such a structure. However, receiver 14 and related components as disclosed herein allow such a cold-spray nozzle 12 to be adapted for connection to a threaded mount of a cold-spray machine 28.

Figure 3:
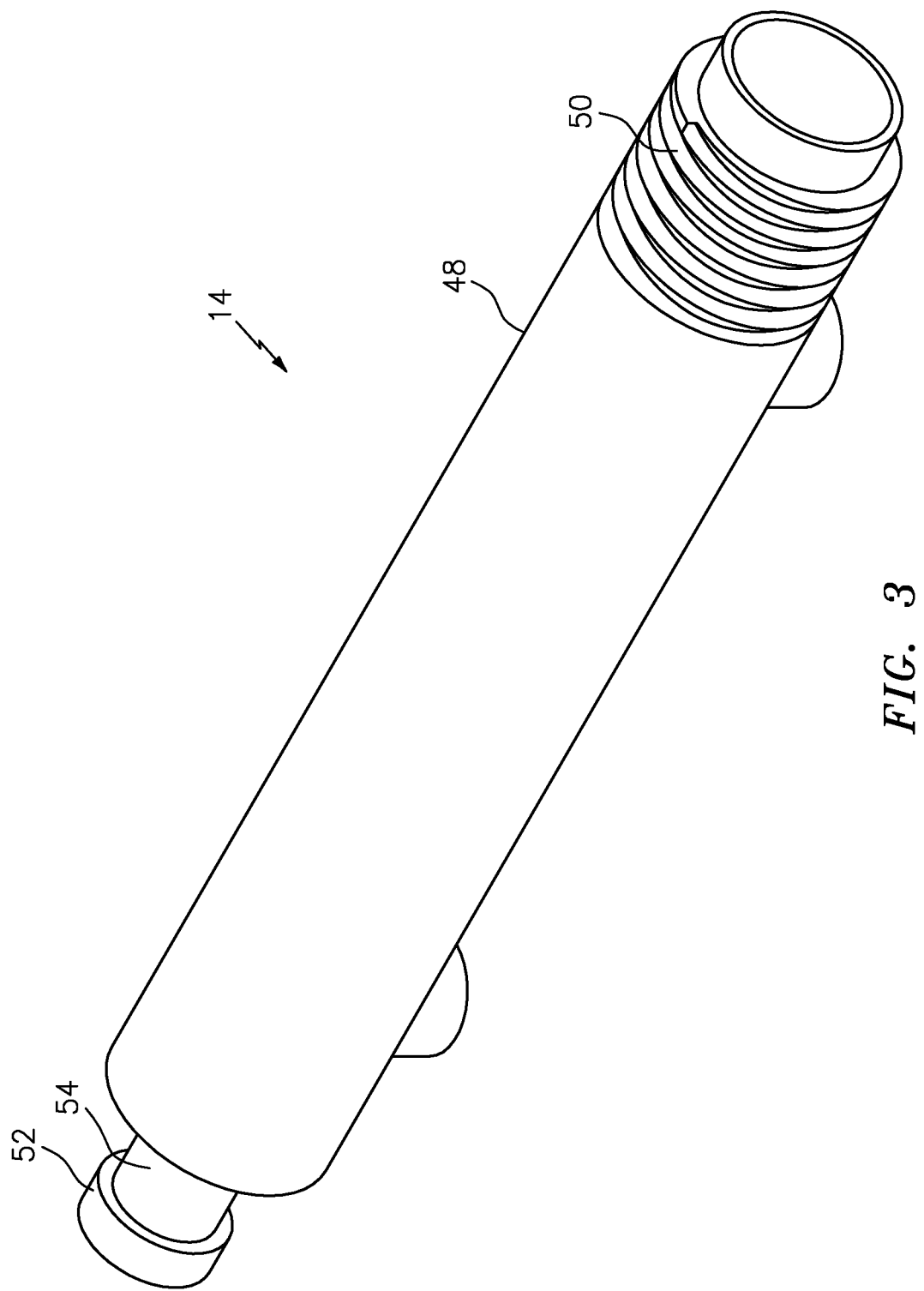
FIG. 3 is a perspective view of the receiver component of the configuration of FIG. 1.

FIG. 3 is an enlarged view of receiver 14 according to the present disclosure, and shows receiver 14 having a substantially cylindrical outer wall 48 with outwardly facing threads 50 defined at an outlet end. Threads 50 are sized to engage with end cap 16. Receiver 14 also has a flange 52 at an inlet end, wherein flange 52 extends radially outwardly, and is connected to the remainder of receiver 14 through a neck portion 54. Referring also to FIG. 1, flange 52 and neck portion 54 are sized to match with a split nut assembly 56 which engages against flange 52 and which itself has the threaded connection 24 for mounting to cold-spray machine 28. Split nut assembly 56 can be provided in multiple, for example, two sections as further discussed below.

Figure 4:
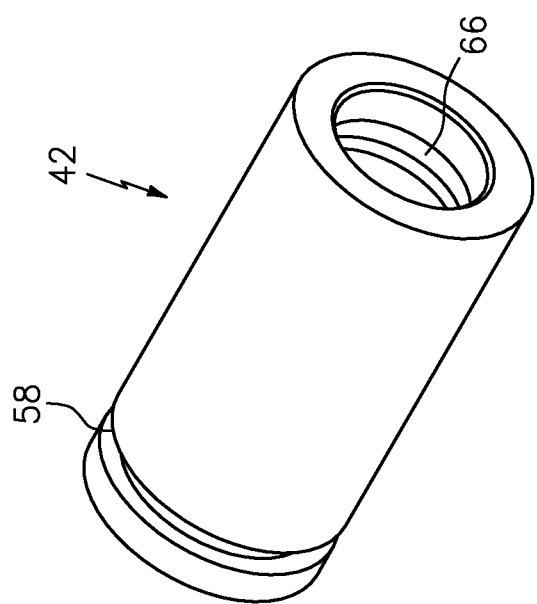
FIG. 4 is a perspective view of the nozzle inlet section of the configuration of FIG. 1.

FIG. 4 shows a perspective view of nozzle inlet section 42, and shows that nozzle inlet section 42 has an outer cylindrical structure including a radially outwardly facing groove 58. Nozzle inlet section 42 is sized to fit within the inner space defined by receiver 14. Referring also to FIG. 1, it can be seen that a first portion 60 of nozzle inlet section 42 defines the converging flow passage 46 as discussed above, and a second portion 62 of nozzle inlet section 42 is sized to receive an end 64 of cold-spray nozzle 12. Further, one or more inwardly facing grooves 66 may be provided on nozzle inlet section 42 to receive one or more seal members to seal against inlet end 64 of cold-spray nozzle 12.

Figure 5:
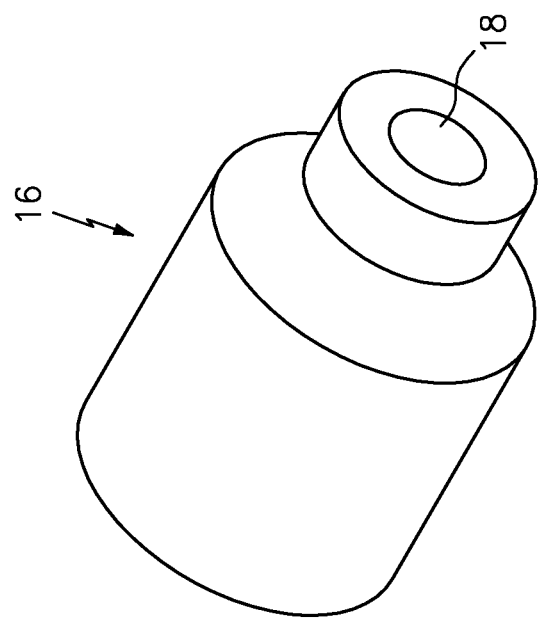
FIG. 5 is a perspective view of the end cap of the configuration of FIG. 1.
Figure 6:
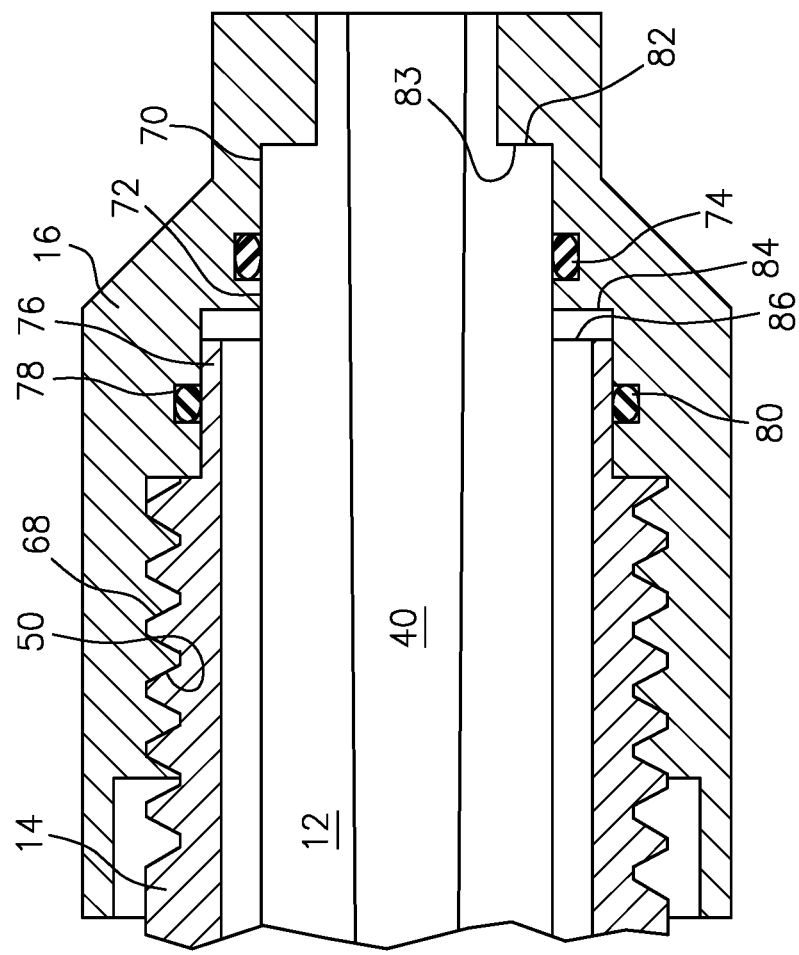
FIG. 6 is an enlarged sectional view of a portion of the receiver, nozzle and end cap of FIG. 1.

FIG. 5 further illustrates end cap 16 according to this configuration, and shows opening 18 which is arranged to align with opening 20 of cold-spray nozzle 12. Referring also to FIG. 6, an enlarged portion of the outlet end of cold-spray nozzle assembly 10 is provided, and illustrates additional detail of this portion of the assembly.

As shown, end cap 16 has inwardly facing threads 68 which are sized to mate with threads 50 of receiver 14. In addition, end cap 16 defines a first portion having a first inner diameter 70 which is matched to an outer diameter of cold-spray nozzle 12. First inner section 70 also has a groove 72 defined therein for receiving a seal 74 which seals against cold-spray nozzle 12.

End cap 16 also has a second inner diameter portion 76 which matches the outer diameter of receiver 14, and which has a groove 78 for receiving a seal 80 to seal against receiver 14.

Figure 7:
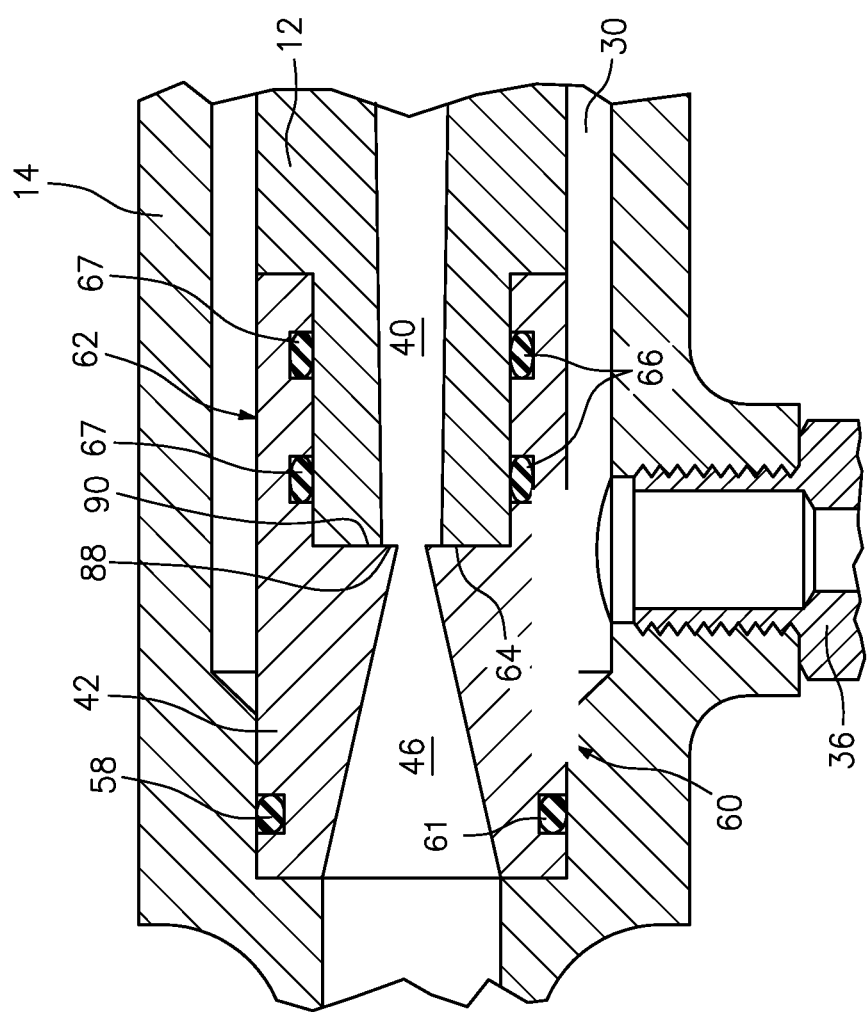
FIG. 7 is an enlarged sectional view of a portion of the receiver, nozzle inlet section and nozzle of FIG. 1.

Endcap 16 may also have a first inner shoulder 82 for engaging against an end face 83 of a portion of cold-spray nozzle 12, and a second inner shoulder 84 which can engage, or alternatively, be spaced from an end face 86 of receiver 14. It is advantageous to configure end cap 16 such that there is a gap between inner shoulder 84 and end face 86, as this helps to accommodate differences in coefficient of thermal expansion (CTE) between receiver 14 and cold-spray nozzle 12. FIG. 7 shows a view of the inlet portion of cold-spray nozzle assembly 10, including nozzle inlet section 42 and related components.

As shown, nozzle inlet section 42 is configured to have converging flow passage 46 in alignment with diverging flow passage 40 of cold-spray nozzle 12. Further, the diameter 88 of an outlet of converging flow passage 46 can advantageously be smaller than diameter 90 of an inlet to passage 40. This mismatch in diameter can help to reduce plugging or clogging of the nozzle due to passage of the heated powders through the flow constriction defined by converging section 46.

FIG. 7 also further illustrates the seal structures between nozzle inlet section 42 and receiver 14, as well as, nozzle inlet 42 and cold-spray nozzle 12. Thus, a seal 61 is shown in groove 58, and seals 67 are shown in grooves 66.

FIG. 7 also further illustrates the cooling inlet 36 to cooling space 30, and cooling outlet 38 would have similar structure.

Figure 8:
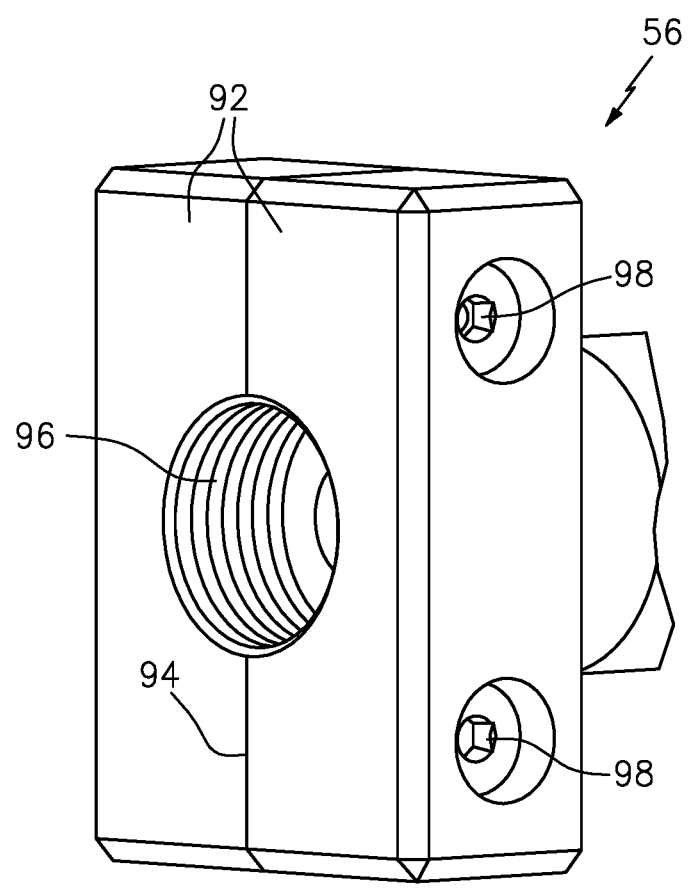
FIG. 8 is a perspective view of the split nut assembly of the configuration of FIG. 1.

FIG. 8 shows a perspective view of a split nut assembly 56 wherein split nut assembly 56 is defined by two portions 92 which split along a centerline 94. Referring also to FIG. 1, it can be seen that split nut assembly 56 defines an inwardly facing threaded structure 96 which corresponds to the threads 24 of FIG. 1, and are for connecting to cold-spray machine 28. Split nut assembly 56 has a radially inwardly extending wall 59 which defines a chamber 57 (FIG. 1) within which flange 52 of receiver 14 is secured, and held in place by wall 59. For ease in assembly, split nut assembly 56 can be assembled around flange 52, and then secured together using fasteners 98. It should be noted that while split nut assembly 56 in this case is illustrated as being two substantially equal portions divided along centerline 94, the ease of assembly could be provided through other configurations. Further, receiver 14 and split nut assembly 56 are illustrated as separate components as this configuration helps what could otherwise be a cumbersome assembly process. It should be appreciated, however, that receiver 14 with threads 24 could be produced as a single structure within the broad scope of the disclosure.

Figure 9:
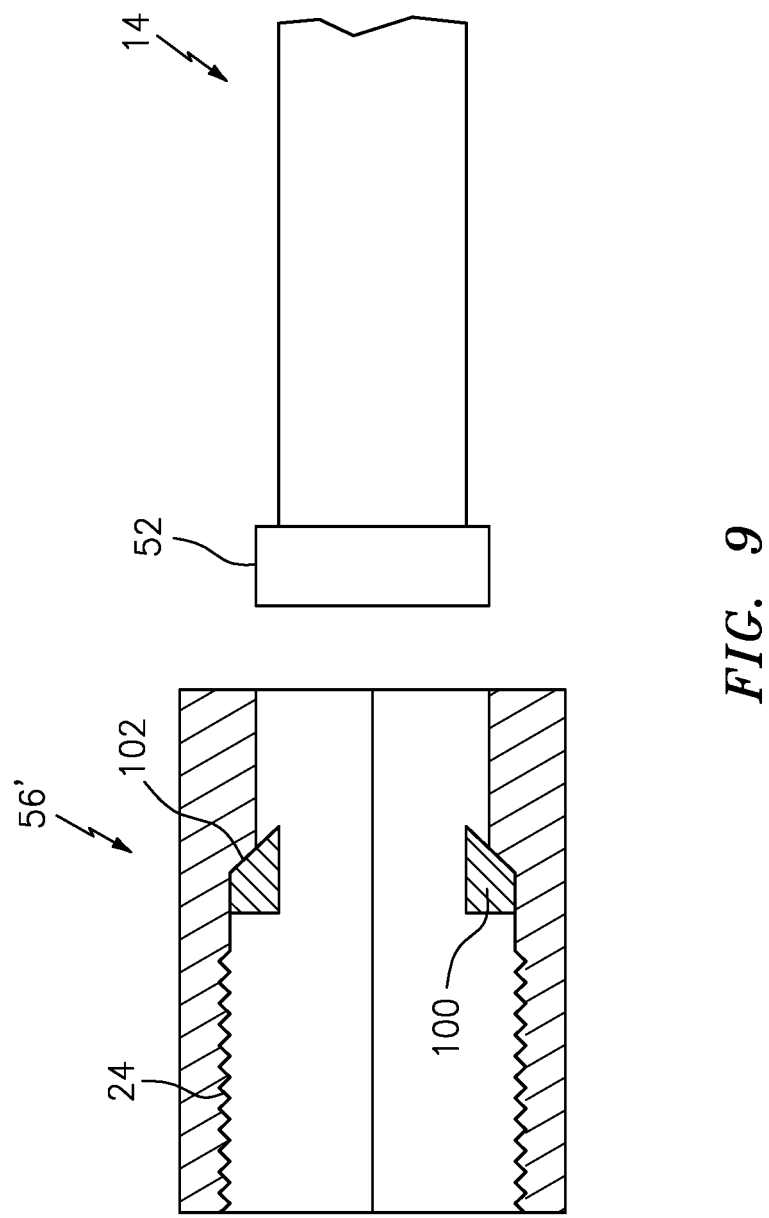
FIG. 9 illustrates an alternative non-limiting embodiment.

Receiver and nut structure is shown. In this configuration, receiver 14 has an end with flange 52 in similar manner to the other illustrated configurations. FIG. 9 also shows structure 56' having threaded connection 4 in similar manner to earlier-discussed split nut assembly 56. In this configuration, however, nut structure 56' is not split, but rather is configured to receive flange 52 of receiver 14, and capture flange 52 within nut structure 56', for example with split wedge ring 100. As shown, nut structure 56' could have a tapered inner wall 102, and split wedge ring 100 can be configured to slide against tapered wall 102 to facilitate capturing of flange 52 as desired.

Considering the figures together, a cold-spray nozzle 12 can readily be mounted to a cold-spray machine 28, even though cold-spray nozzle 12 is not compatible with the threaded connection of cold-spray machine 28. This can be accomplished by first positioning a nozzle inlet section 42 with accompanying seals into receiver 14. Then, cold-spray nozzle 12 is also positioned into receiver 14 such that it aligns with nozzle inlet section 42, for example, as shown in FIG. 1. Next, end cap 16 can be secured, with accompanying seals, onto the threaded end of receiver 14 to securely hold cold-spray nozzle 12 within receiver 14.

This assembly can then be secured into split nut assembly 56, or receiver 14 could be mounted first in split nut assembly 56 if preferable. At this stage, cold-spray nozzle assembly 10 is ready to be mounted to cold-spray machine 28 for use. With a configuration such as that disclosed herein, it should be appreciated that various different cold-spray nozzles can be adapted to mate with cold-spray machines with which they would not normally be compatible, thereby increasing the options for various different nozzles that can be used by an operator of a cold-spray machine.

The use of "first", "second", and the like in the description and following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing basic system, details of such configuration or its associated use may influence details of particular implementations. Accordingly, other embodiments are within the scope of the following claims.

We claim:

1. An adapter for connecting a cold-spray nozzle to a cold-spray machine, comprising:
    a receiver having a first end and a second end and defining an internal space for receiving the cold-spray nozzle;
    an end cap engageable with the first end of the receiver for securing the cold-spray nozzle in the receiver and having an opening aligned with an outlet of the cold-spray nozzle; and
    a threaded connection at the second end of the receiver, the threaded connection being configured for connection to the cold-spray machine, wherein the end cap has a first inner diameter section configured to match an outside diameter of the cold-spray nozzle, and a second inner diameter section configured to match an outside diameter of the receiver and further comprising a first inwardly facing groove in the first inner diameter section, a first seal positioned in the first inwardly facing groove to seal against the cold-spray nozzle, a second inwardly facing groove in the second inner diameter section, and a second seal in the second inwardly facing groove to seal against the receiver.

2. The adapter of claim 1, further comprising a nut structure attached to the second end of the receiver and defining the threaded connection.

3. The adapter of claim 2, wherein the second end of the receiver has a radially outwardly extending flange, and wherein the nut structure has a radially inwardly extending wall configured to engage against the flange of the receiver.

4. The adapter of claim 3, wherein the nut structure comprises a split nut assembly.

5. The adapter of claim 4, wherein the split nut assembly comprises two nut portions configured to be assembled around the flange of the receiver, and at least one fastener to hold the two nut portions together in an assembled position.

6. The adapter of claim 3, further comprising a retaining member to capture the flange of the receiver in the nut structure.

7. The adapter of claim 6, wherein the inwardly extending wall is a tapered wall, and wherein the retaining member comprises a split wedge ring configured to slide along the tapered wall.

8. The system of claim 2, wherein the nozzle inlet section defines a converging flow area leading to the cold-spray nozzle.

9. The system of claim 8, wherein an outlet end of the converging flow area terminates in a diameter which is smaller than an inlet to the cold-spray nozzle.

10. The system of claim 8, wherein the nozzle inlet section further comprises an outwardly facing groove, and further comprising a seal positioned in the groove to seal against an inner wall of the receiver.

11. The adapter of claim 1, further comprising a nozzle inlet section in the internal space and positioned to align with the cold-spray nozzle.

12. The adapter of claim 11, wherein the nozzle inlet section defines a converging flow area leading to the cold-spray nozzle.

13. The adapter of claim 12, wherein an outlet end of the converging flow area terminates in a diameter which is smaller than an inlet to the cold-spray nozzle.

14. The adapter of claim 12, wherein the nozzle inlet section further comprises an outwardly facing groove, and further comprising a seal positioned in the groove to seal against an inner wall of the receiver.

15. The adapter of claim 1, wherein a cooling space is defined between an inner wall of the receiver and an outer wall of the cold-spray nozzle, and further comprising a cooling inlet and a cooling outlet on the receiver for flow of coolant through the cooling space.

16. A cold-spray system, comprising:
    a cold-spray machine configured to generate a flow of cold-spray materials and having a threaded connection for a cold-spray nozzle;
    a receiver having a first end and a second end and defining an internal space for receiving a cold-spray nozzle;
    an end cap engageable with the first end of the receiver for securing the cold-spray nozzle in the receiver and having an opening aligned with an outlet of the cold-spray nozzle; and
    a threaded connection at the second end of the receiver, the threaded connection being configured for connection to the threaded connection of the cold-spray machine such that the cold-spray nozzle receives the flow of cold-spray materials, wherein the end cap has a first inner diameter section configured to match an outside diameter of the cold-spray nozzle, and a second inner diameter section configured to match an outside diameter of the receiver and further comprising a first inwardly facing groove in the first inner diameter section, a first seal positioned in the first inwardly facing groove to seal against the cold-spray nozzle, a second inwardly facing groove in the second inner diameter section, and a second seal in the second inwardly facing groove to seal against the receiver.

17. The system of claim 16, further comprising a nut structure attached to the second end of the receiver and defining the threaded connection.

18. The system of claim 17, wherein the second end of the receiver has a radially outwardly extending flange, and wherein the nut structure has a radially inwardly extending wall configured to engage against the flange of the receiver.

19. The system of claim 18, wherein the nut structure comprises a split nut assembly.

20. The system of claim 19, wherein the split nut assembly comprises two nut portions configured to be assembled around the flange of the receiver, and at least one fastener to hold the two nut portions together in an assembled position.

21. The system of claim 18, further comprising a retaining member to capture the flange of the receiver in the nut structure.

22. The system of claim 21, wherein the inwardly extending wall is a tapered wall, and wherein the retaining member comprises a split wedge ring configured to slide along the tapered wall.

23. The system of claim 16, further comprising a nozzle inlet section in the internal space and positioned to align with the cold-spray nozzle.

24. The system of claim 16, wherein a cooling space is defined between an inner wall of the receiver and an outer wall of the cold-spray nozzle, and further comprising a cooling inlet and a cooling outlet on the receiver for flow of coolant through the cooling space.

* * * * *